United States Patent [19]  
Watanabe et al.

[11] 4,352,717  
[45] Oct. 5, 1982

[54] APPARATUS FOR PRODUCTION OF SPHERICAL GRAIN FERRITE POWDER

[75] Inventors: Yasuo Watanabe; Seizi Isoyama, both of Okayama; Yoshikazu Yamamichi, Tokyo, all of Japan

[73] Assignee: Dowa Mining Co., Ltd., Tokyo, Japan

[21] Appl. No.: 866,703

[22] Filed: Jan. 3, 1978

Related U.S. Application Data

[62] Division of Ser. No. 823,345, Aug. 10, 1977, abandoned.

[30] Foreign Application Priority Data

Aug. 12, 1975 [JP] Japan .................................. 50-97844

[51] Int. Cl.³ .............................................. B01D 1/18
[52] U.S. Cl. ..................................... 159/4 E; 159/45; 23/313 R; 423/594
[58] Field of Search ............... 23/313 R; 159/4 E, 45; 423/594; 422/307, 309

[56] References Cited

U.S. PATENT DOCUMENTS 3,378,335  4/1968  Ellis et al. ............................. 423/99  
3,474,849 10/1969  Inchausti ............................ 159/4 E  
3,896,216  7/1975  Pagheralli et al. .................. 423/598

OTHER PUBLICATIONS

Jl. of the Am. Ceramic Soc.-Eionomus, vol. 38, No. 7, 1955, pp. 241–244.

Primary Examiner—Hiram H. Bernstein  
Attorney, Agent, or Firm—Frishauf, Holtz, Goodman and Woodward

[57] ABSTRACT

Apparatus for producing substantially spherical grain ferrite powder comprising a vertical cylindrical vessel in which a slurry of ferrite-forming powdered raw materials in alcohol is sprayed under applied pressure through a spray nozzle into a high temperature atmosphere of between 700°–1500° C. to allow the combustion of sprayed alcohol therein, thereby instantaneously producing spherical grain-ferrite powder. A hot air guide is provided along the inner surface of the wall of the vertical vessel extending upward in a spiral for providing a hot air current rising spirally upwardly within the vessel to provide a high temperature atmosphere above the spray nozzle.

3 Claims, 4 Drawing Figures x 50 x 150 x 500

APPARATUS FOR PRODUCTION OF SPHERICAL GRAIN FERRITE POWDER

This is a division, of application Ser. No. 823,345, filed Aug. 10, 1977 now abandoned.

The present invention relates to an apparatus for the production of a spherical-grain ferrite powder. More particularly, the present invention relates to an apparatus for the instantaneous formation of a spherical-grain ferrite powder in a continuous manner.

Heretofore, a ferrite powder such as one to be used for a carrier in the dry process copying machine has generally been produced by a process comprising a number of separate steps such as, for example, a step for granulation and drying of raw material which is usually carried out in a spray drier and a separate step for sintering the drier product which is usually carried out in a muffle furnace, a rotary kiln or the like.

This type of prior art process, however, includes a number of drawbacks. For example, it generally requires two or three separate steps. In addition, if the sintering is carried out in a muffle furnace, a residence time of at least 2 hours and, sometimes, even as long as 10 hours is required. Alternatively, if the sintering is carried out in a rotary kiln, troublesome problems such as adhesion of clinkers to the inner surface of the kiln or agglomeration of grains often occur. Thus, the process for the production of homogeneous and spherical-grain ferrite powder has been accompanied by a number of difficulties.

Accordingly, the object of the present invention is to provide a novel apparatus for the production of a spherical-grain ferrite powder which can ensure the instantaneous production of the above-mentioned ferrite powder directly from ferrite-forming raw materials or and ferrite-formed raw materials.

According to their experiments, the present inventors have found that by making a suspension in alcohol of various ferrite-formed and ferrite-forming raw materials and spraying said suspension into a high temperature zone, all the steps required for the production of ferrite such as the steps of granulation, ferrite-formation for such forming raw materials and sintering can be accomplished instantaneously and spherical-grain ferrite powder is readily obtained. Thus, the process of the present invention comprises (1) the step of dispersing finely powdered ferrite-forming raw materials in alcohol, (2) the step of spraying the resulting suspension into a hot air zone at a temperature in the range of 700° to 1500° C. and (3) the step of keeping the sprayed raw materials in the same zone to carry out the granulation, ferrite-formation and sintering of the same while it remains in said high temperature zone.

The term "ferrite-forming, finely powdered raw material or materials" herein used include a wide variety of different materials. Through the tracking experiments, the present inventors have confirmed that almost all of those mixtures which can form a compound having the generic formula: $MO.Fe_2O_3$, wherein M represents a divalent metal, are usable in the practice of the present invention. Representative examples of such materials can be classified in the manner as shown below.

(a) Oxide-type or carbonate-type materials:

The combinations of (1) $Fe_2O_3$ and one or two or more of these types of materials included Mn, Ni, Zn, Co, Mg, Cu, Li, and the like as well as the combinations of (1) $Fe_2O_3$ and (2) one or two or more of Ba, Sr and the like.

(b) The simple- or complex-spinel or hexagonal types of ferrite powders prepared by the solid phase reactions from the materials given in (a) at a temperature in the range of 800°–1500° C.

(c) Fine grains, singly or in mixture, of simple-spinel type ferrite having an average grain size of 50–100 Å prepared by the "neutralization method" according to the following reactions:

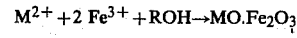

wherein M represents Mn, Ni, Zn, Co, Mg and the like, and R represents Na, K, NH$_4$ and the like.

(d) Simple- or complex-spinel type ferrite grains having an average grain size of 0.1–1 micron prepared by the "oxidation method" according to the following reactions.

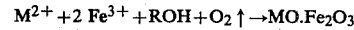

wherein M represents Mn, Co, Mg, Zn and the like and R represents Na, K, NH$_4$ and the like.

(e) Hydroxide or carbonate or a mixture of both to be used as a raw material for hexagonal ferrite each containing one or two or more of $Ba^{2+}$, $Sr^{2+}$, and the like with $Fe^{3+}$ prepared by the "co-precipitation method".

These ferrite-formed or ferrite-forming raw material powders are then suspended in an alcohol. A number of various alcohols can be used for the purpose. For example, methyl alcohol for industrial use which is easily available can conveniently be used in the practice of the present invention. The preferred range of solids content of the slurry is experimentally determined for each case depending on the raw materials specifically used, the operating conditions specifically employed and the like, but a solids content of 10–70% by weight is generally employed.

The operations of spraying this slurry into a high temperature zone and of keeping the sprayed materials in the same zone can be carried out in a continuous manner if an apparatus having the structure as shown in FIG. 1 in the attached drawing is employed, and the production of highly homogeneous quality and spherical-grain ferrite powder is ensured. The above mentioned operations will be further explained below referring to the apparatus shown in the drawing.

DETAILED DESCRIPTION

Figure 1:
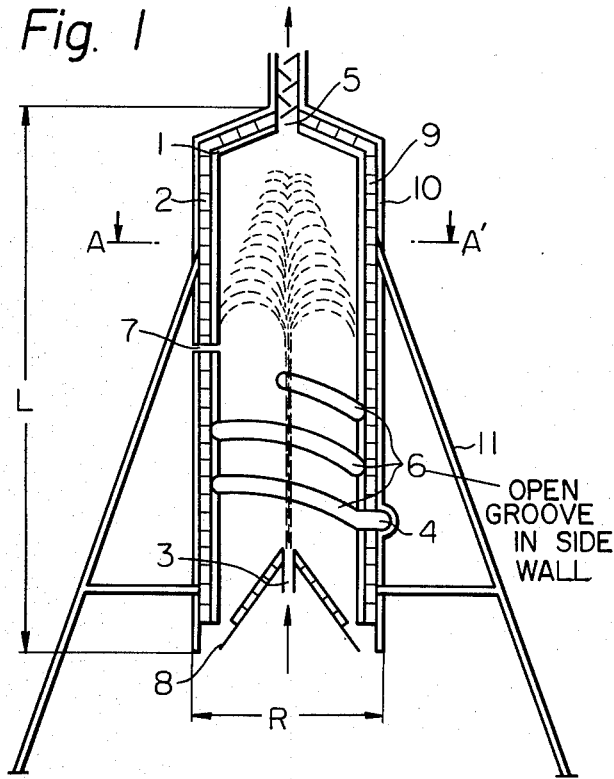
FIG. 1 shows a vertical section of one preferred example of the apparatus of the present invention which can be used conveniently in the practice of the process of the present invention.

In the drawing, the numerical symbols represent the following things, respectively. 1: refractory brick; 2: insulating brick; 3: slurry spray nozzle; 4: hot air inlet; 5: waste gas outlet; 6: hot air guiding means; 7: hole for measuring temperature (also used as a peep hole); 8: reaction product outlet.

Figure 3:
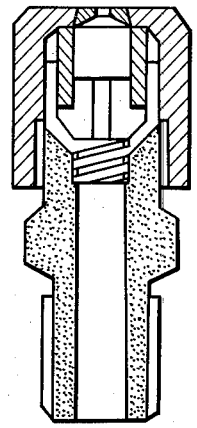
FIG. 3 shows a longitudinal section of one preferred example of the slurry spraying nozzle usable in the process of the present invention.
Figure 2:
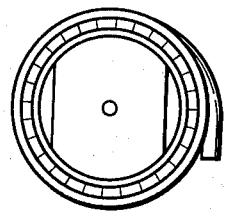
FIG. 2 shows a horizontal section of the apparatus shown in FIG. 1 at the position of A—A' plane.

Referring to FIGS. 1-3, the apparatus of the present invention comprises a vertical cylindrical vessel having a lining of refractories (refractory brick 1 and insulating brick 2). A jet nozzle 3 from which the slurry is to be sprayed is provided in the center of the bottom. At the lower portion of the wall is provided a hot air inlet 4 and an exhaust outlet 5 is provided at the top. A hot air guiding means 6 for example in the form of an open groove extends upwards in the shape of a spiral from said hot air inlet 4 along the inner surface of the wall. A high temperature zone is formed in the vessel by a stream of hot air rising along said guiding means 6 provided on the inner surface of the wall. At the same time, a slurry of raw materials in alcohol is continuously sprayed through the nozzle 3 in the direction of the axial flow of the rising air current, namely in the direction of the axis of the cylinder. In FIG. 1 the numerical symbol 7 represents a temperature-checking hole (which is also a peep hole), 8 represents an outlet for the reaction products, 9 represents an iron-made shell, 10 represents heat insulating material and 11 represents a strut pole.

The ratio of diameter to height (R/L) of the apparatus is about ¼.

In the practice of the present invention, hot air at a temperature of about 1200° C. provided by a kerosene burner is introduced into the above mentioned apparatus from the inlet 4 and at the same time a slurry of raw materials suspended in alcohol is sprayed vertically upwards from the jet nozzle 3. In this manner, alcohol burns and the steps of granulation, ferrite-formation and sintering of the powdered raw materials are accomplished instantaneously.

Sintered grains thus produced fall in the reaction vessel and are removed from the product outlet 8. The product thus obtained is immediately available for various uses as a spherical-grain ferrite powder.

In the process of the present invention, the combustion of alcohol in this way seems to enable the instantaneous accomplishment of granulation, ferrite-formation and sintering of the raw materials comprising fine grains on the order of microns and helps to standardize the ferrite quality and form spherical grain shapes. Accordingly, the operation is normally carried out in an atmosphere having the remaining $O_2$ concentration in the region of 3-5%. In some cases, however, depending on the raw materials employed, better results can be obtained by operating the process either in the more oxidizing or in the more reducing atmosphere than that mentioned above.

As regards the temperatures of the high temperature atmosphere, when the above mentioned type of ferrite-forming raw materials are employed, good results can be obtained for temperatures ranging from 700° and 1500° C. As a nozzle 3 for spraying the slurry, simple type nozzle having the structure as shown in FIG. 3 can be used conveniently.

The body of this nozzle consists of a heat resisting metal and the nozzle-tip portion thereof or its portion of contact with liquid of the slurry is made of a wear resisting and corrosion resisting material which consists primarily of ceramics.

The raw material slurry is pressure-fed to the nozzle by a plunger pump or from the pressure tank at a pressure for example in the region of 2-50 kg/cm$^2$.

The grain size of the desired spherical-grain ferrite can be controlled by the proper selection of various factors including the diameter of the nozzle, the pressure applied to the slurry, the solids concentration of the slurry and the like. The following examples will further illustrate the present invention.

EXAMPLE 1

Figure 4:
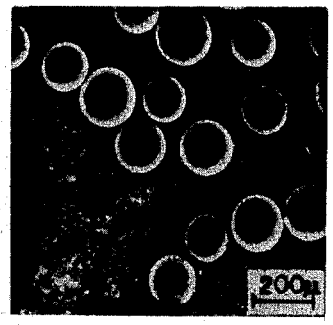
FIG. 4 shows a scanning type electron microscope photograph of the spherical-grain ferrite powder obtained by the process of the present invention.
Figure 4:
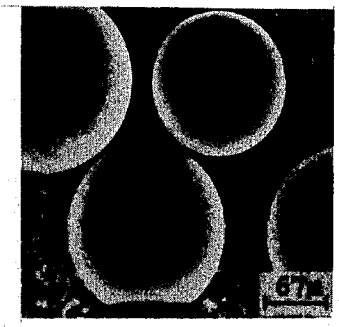
Figure 4:
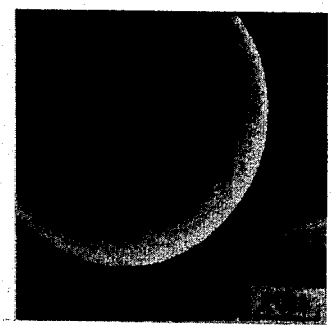

Finely powdered oxides of Ni, Zn and Fe each having an average grain size of 1.0 micron or less were weighed respectively so as to obtain the formulation of 15% by weight of NiO, 35% by weight of ZnO and 50% by weight of $Fe_2O_3$ and were suspended in methyl alcohol for industrial use to provide a slurry having a solids content of 45%. The resulting slurry was transported to a jet nozzle under applied pressure of 2 kg/cm$^2$ and was spurted from the nozzle into the reaction vessel having the structure as shown in FIG. 1 in the attached drawing, the inside of which was held at a temperature in the range of 1200°-1250° C. by the combustion gas from a kerosine burner introduced therein from the hot gas inlet. A series of reactions including granulation, ferrite-formation and sintering were carried out instantaneously, and the powdered product was obtained. This powder was confirmed by X-ray diffraction analysis to have the Ni-Zn type ferrite composition. This powder had the saturation magnetization ($\sigma_s$) of 50 emu/g and a density (d) of 5.0 g/cm$^3$. Grains were spherical and 90% thereof were in the range of 30-200 microns in their grain size. The scanning type electron microscope photograph of the product grains was as shown in FIG. 4.

EXAMPLE 2

Finely powdered carbonates and oxides of Cu, Zn and Fe used as raw materials each having an average grain diameter of 1.0 micron or less were weighed respectively so as to obtain the formulation of 25% by weight of CuO, 25% by weight of ZnO and 50% by weight of $Fe_2O_3$ and they were suspended in methyl alcohol for industrial use to provide a slurry having a solids content of 40%. Except that this slurry was used as raw material for spraying, the same procedures as in Example 1 were repeated. The powdered product thus obtained was Cu-Zn ferrite having the saturation magnetization ($\sigma_s$) of 38 emu/g and a density of 4.9 g/cm$^3$. Grains were spherical and 90% thereof were in the range of 30-200 microns in their grain size.

EXAMPLE 3

Finely powdered oxides and carbonates of Mg, Zn and Fe each having an average grain size of 1.0 micron or less were weighed respectively so as to obtain the formulation of 25% by weight of MgO, 25% by weight of ZnO and 50% by weight of $Fe_2O_3$ and then they were suspended in methyl alcohol for industrial use to provide a slurry having a solids content of 50%. Except that this slurry was used as a raw material to be sprayed into the reaction vessel, the same treatment as in Example 1 was repeated. Mg-Zn ferrite having the saturation magnetization ($\sigma_s$) of 40 emu/g and a density (d) of 4.7 g/cm$^3$ was obtained. Grains having the grain size of 50-250 microns made up 80% of the total.

EXAMPLE 4

Carbonates and oxides of Ba and Fe each having an average grain size of 1.0 micron or less were weighed respectively so as to obtain the formulation for BaO.5.-

$5Fe_2O_3$ and they were suspended in methyl alcohol for industrial use to provide a slurry having a solids content of 50%. This slurry was transported and sprayed under applied pressure of 2.5 kg/cm$^2$ into the reaction vessel as shown in FIG. 1 in the attached drawing and kept at a temperature in the range of 1200°–1300° C. The spherical-grain barium ferrite powder thus produced in the apparatus after finishing granulation, ferrite-formation and sintering was observed to possess the saturation magnetization ($\sigma_s$) of 58 emu/g. This powder also comprises highly spherical grains as in previous examples and had a density (d) of 4.9 g/cm$^3$ and 90% of the grains were in the range of 30–200 microns in their grain size.

EXAMPLE 5

The same procedures as in Example 4 were repeated except that SrO was used instead of BaO. The produced spherical-grain strontium ferrite had a magnetic saturation value ($\sigma_s$) of 53 emu/g, a density (d) of 4.7 g/cm$^3$, and 90% of the grains were in the range of 30–200 microns in their grain size.

EXAMPLE 6

$NiFe_2O_4$ and $ZnFe_2O_4$ both prepared by the "neutralization method" were dried at low temperatures. Then, using these compounds as a raw material powder, both were weighed respectively to obtain a composition having the same formulation as in Example 1. The above composition was treated under the same conditions as in Example 1 and a nickle-zinc ferrite was prepared. The product thus obtained was a spherical-grain powder and its characteristic properties included the saturation magnetization ($\sigma_s$) of 55 emu/g, and a density (d) of 4.9 g/cm$^3$. The grain size thereof was such that 90% of the powder was in the range of 50–200 microns.

EXAMPLE 7

A mixture of hydroxides and carbonates of Ba and Fe containing 12 Fe ions per 1 Ba ion was precipitated from an aqueous solution by the "co-precipitation method", and the precipitate was fully washed and dried. The fine-grain powder thus obtained was then dispersed in methyl alcohol for industrial use to provide a slurry having a solids content of 40%. Then, the slurry was transported and spurted under applied pressure of 3 kg/cm$^2$ into the inside of the reaction vessel shown in FIG. 1 when the temperature therein reached 1200°–1250° C.

The powdered product obtained after a series of reactions carried out in the vessel including granulation, ferrite-formation and sintering was barium-ferrite having the saturation magnetization ($\sigma_s$) of 49 emu/g, and a density (d) of 4.9 g/cm$^3$, and the grain size thereof was such that 90% of the total grains were in the range of 50–200 microns.

As is obvious from the above examples, a soft and a hard ferrite can be obtained instantaneously from a variety of different ferrite-forming raw materials according to the process and apparatus of the present inventions. Moreover, the resulting ferrite is homogeneous in quality and comprises highly spherical grains and is of extremely high quality.

Heretofore, it has been considered that one of the best ways for improving the characteristic properties of ferrite material is to carry out the pressing or compacting of mixed raw materials before such mixture is subjected to sintering. Considering this fact, the process of the present invention has really brought about countless advantages: the simplification of operation steps, shortening of reaction time and the sensitive controlability of the production process due to the increased number of controllable operation factors.

What we claim is:

1. Apparatus for the production of substantially spherical grain-ferrite powder which comprises:
   a vertical cylindrical vessel having a lining of refractory material;
   a hot air intake provided at the lower portion of the wall of said vertical vessel;
   an exhaust vent provided at the top of said vertical vessel;
   a spray nozzle provided in the center of the bottom of said vertical vessel and oriented to provide a continuous jetting feed of a ferrite powder suspension rising in the same direction as the axis of said vertical cylindrical vessel;
   an open groove hot air guide provided along the inner surface of the wall of said vertical vessel, said open groove opening to the interior of said vertical vessel and extending upward in a spiral form starting from said hot air intake and toward said exhaust vent for providing a hot air current rising spirally upwardly within said vessel and around said sprayed suspension to produce a high temperature atmosphere above said spray nozzle for the formation of substantially spherical-grain ferrite particles from said sprayed suspension; and
   an outlet at the lower end of said vessel for removal of said substantially spherical-grain ferrite particles.

2. Apparatus according to claim 1, wherein said hot air guide produces a high temperature atmosphere in the range of from about 700° to about 1500° C.

3. Apparatus according to claim 1, wherein said nozzle jets in a suspension of ferrite powder in alcohol.

* * * * *